April 13, 1926.  W. F. LAUTENSCHLAGER  1,580,208
WATER HEATER
Filed Nov. 15, 1921  2 Sheets-Sheet 1
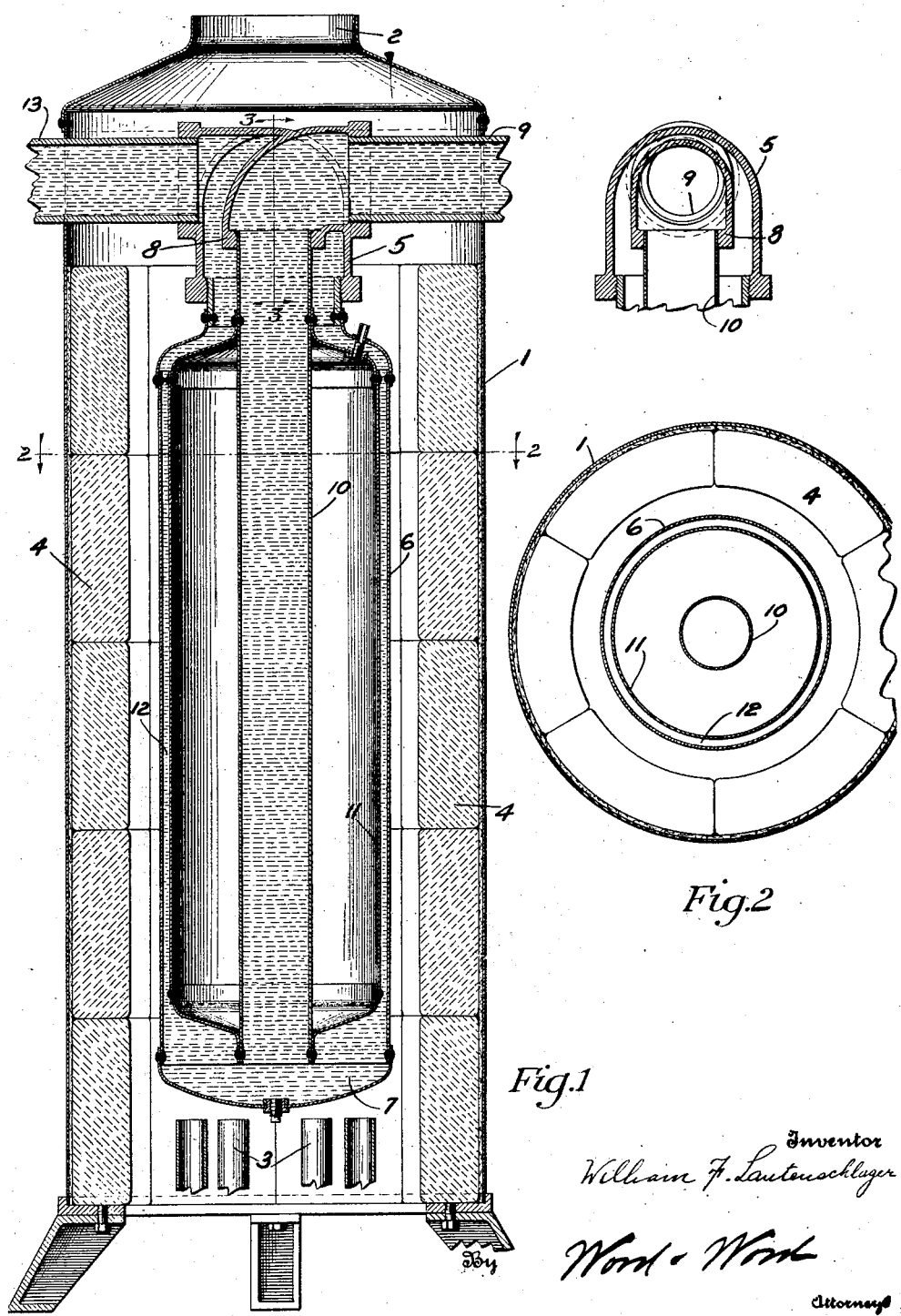

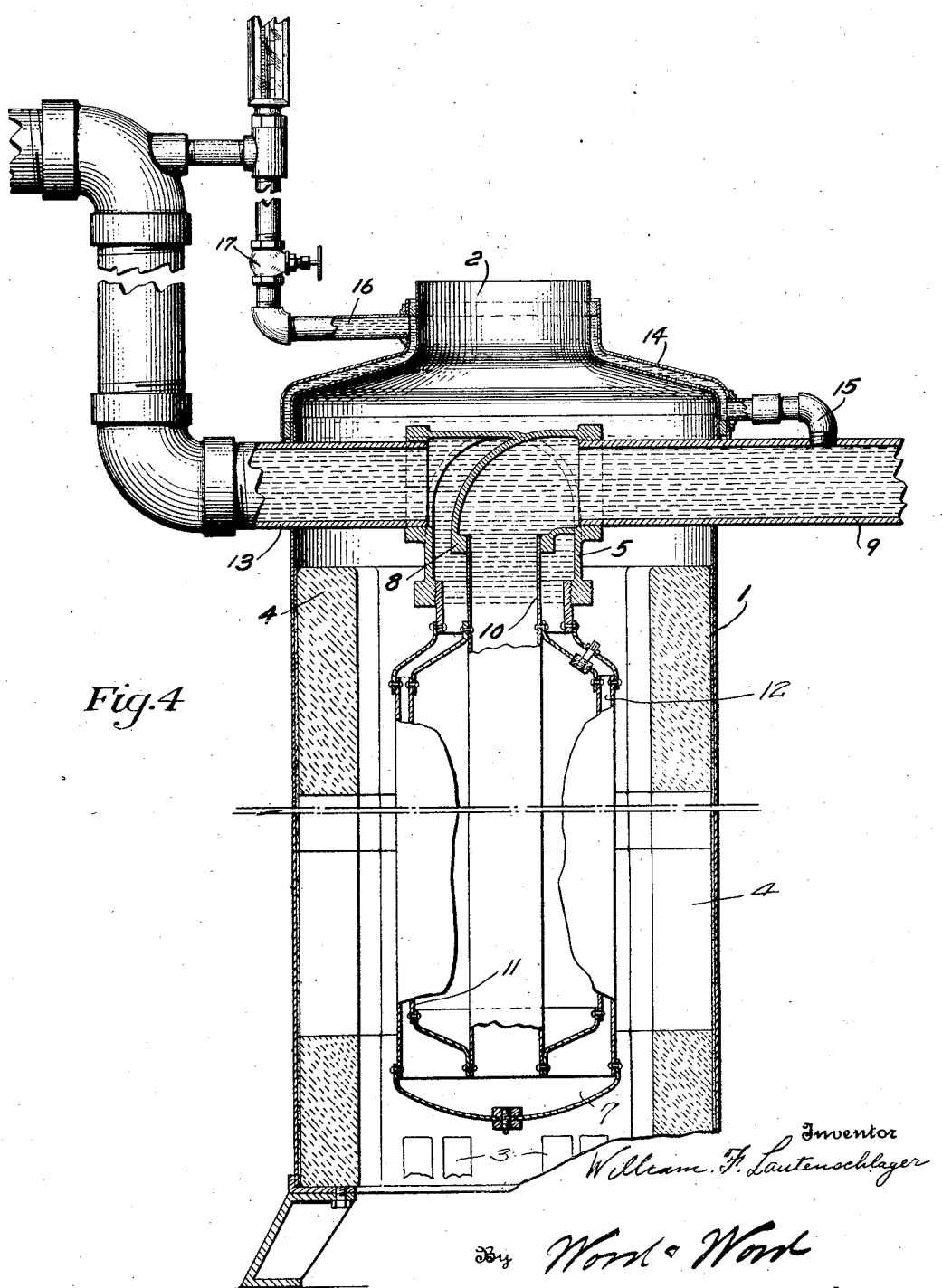

Patented Apr. 13, 1926.

1,580,208

UNITED STATES PATENT OFFICE.

WILLIAM F. LAUTENSCHLAGER, OF CINCINNATI, OHIO.

WATER HEATER.

Application filed November 15, 1921. Serial No. 515,388.

*To all whom it may concern:*

Be it known that I, WILLIAM F. LAUTENSCHLAGER, a citizen of the United States, and residing at Cincinnati, in the county of Hamilton and State of Ohio, have invented a new and useful Improvement in Water Heaters, of which the following specification is a full disclosure.

My invention relates to a hot-water heater, the object being to provide an economical apparatus, avoiding the usage of water coils, the principle of the construction involving means providing an exposure to the heat zone of a wide area water flow of relatively small cross section, the heating zone extending practically for the vertical length of the heater, there being heating surfaces disposed at the bottom and upon both the inner and the outer sides of this annular film-like column of water which flows vertically upward from the base of the heater.

More particularly I provide an annular, relatively thin, cross section column of water exteriorly surrounded by the products of combustion, with the attenuated water column insulated from the incoming cold water column by means of an interior annular air chamber through which the water is conducted to the base of the heater.

The features of the invention are more fully set forth in a description of the accompanying drawings, forming a part of this specification, in which:

Figure 1 is a central vertical section.
Figure 2 is a section on line 2—2 of Fig. 1.
Figure 3 is a section on line 3—3 of Fig. 1.
Figure 4 is a partial central vertical section showing a modified form of the invention.

The heater is surrounded by a circumferential hollow body 1, open at the top 2, for the escape of the products of combustion, the burner 3 being in the base, the body 1 is either open or provided with openings admitting air to support combustion. Maximum heating surface and heat retention means are provided by peripherally lining the inner wall of said body with a refractory material or fire-brick 4. In the upper portion of body 1 is suitably secured a T-coupling 5, constituting a water inlet and outlet, the details of which will be later specified.

From the lower end of this member 5 is suspended the water heating tank 6, the lower end 7 of which is positioned just above the burner, the end or base portion 7 constituting the initial water heating chamber into which the cold water is delivered.

In the center of member 5 is an elbow 8, the upper end of which couples horizontally with the cold-water inlet 9, there being coupled to the lower end of the elbow a cold-water drop pipe 10, extending vertically through the center of the tank or drum 11 and communicating with the chamber 7 at the bottom 1. This tank or drum 11 is secured to the upper and lower ends of this drop pipe and within the tank 6, concentrically therewith, constituting an annular air insulating chamber surrounding the cold-water supply pipe 10, the space between the walls of tanks 6 and 11 constituting an annular water heating conduit 12, leading upwardly from chamber 7. This provides an extended area or film-like water body subjected to heat on the outside and inside, the base chamber 7 thereof being directly over the burner. The hot-water flows through this constricted heating annulus into the annular chamber of the member 5, surrounding the inlet elbow, and it is discharged through the off-take 13, which communicates horizontally with member 5.

In the modified or amplified heating apparatus of Fig. 4, the upper portion of the heater body 1 is surrounded by a water-jacketed cap 14, supplied with water through the pipe 15, tapping the cold-water supply and discharging hot-water through the pipe 16, into the hot-water off-take 13, thus utilizing the heat which would otherwise be uselessly radiated.

This provides a by-pass connection, of a restricted capacity across the inlet and outlet leads of the boiler, and exposes it to the heat of the furnace surrounding the boiler, for highly heating the water circulating through the furnace cap or top as a part of the by-pass. The water circulating through the by-pass is therefore heated to a higher degree than the water circulating through the boiler, whereby its velocity is increased. This highly heated by-pass circulating water is injected into the boiler hot-water discharge or feed line at a point where it will qualify as a water lifting ejector to boost or aid in increasing the velocity or water circulation through the boiler. The by-pass is provided with a valve 17 interposed in the piping 16, for regulating the volume of water flow through the by-pass  The water-jacketed cap, aside from providing an enlarged heat exposed area in the by-pass line, serves as an insulating cover for the top of the furnace and thereby reduces the radiation of heat into the room in which the boiler is located. This is of particular advantage, when the boiler is installed in the cellar of a dwelling, to avoid excessive heating of the cellar atmosphere.

This apparatus can be economically manufactured, easily assembled, and provides a maximum heating surface in relation to a maximum water area of relatively small dimension in cross section.

In practice, the operation of this device is most economical, hot water being produced in an extremely short time after lighting the burner, the possibilities of leakage being reduced to a minimum.

An additional advantage is in the avoidance of having water coils exposed to the flame or corrosive influence of the products of combustion.

Having described my invention, I claim:

1. A hot water heater comprising a coupling member having inlet and outlet passages therein, and inlet and outlet pipes connected with respective passages, a cold water drop pipe connected with said coupling and inlet passage, an air tank concentrically attached to and surrounding said pipe forming an insulation for said pipe, a second tank concentrically surrounding said air tank attached to said coupling and forming with said air tank an attenuated annular water heating chamber between said tanks, said chamber at its bottom connecting with said drop pipe and connecting at its top with said outlet passage, an open end heater body having a constricted upper end, said body having at its constricted portion an attenuated annular water chamber, said chamber connected by relatively small inlet and outlet pipes with respective first mentioned inlet and outlet pipes, with the discharge end of the second outlet pipe entering the first mentioned outlet pipe above the top of the heater body, and means for applying heat to the bottom of said second tank.

2. A hot water heater, comprising an open end heater body, said body near the top having a constriction therein, an attenuated annular water chamber formed at said constricted portion, a coupler member at the top of said body having inlet and outlet passages therein, a cold water supply inlet attached to said inlet passage and centrally supported from said coupler member, an annular air tank attached to said cold water inlet pipe, said tank supported by surrounding and insulating said pipe, a heating tank suspended from said coupler member connected, with said coupler member, concentrically with said air tank and spaced therefrom to form an attenuated annular chamber, said chamber in communication with the outlet passage of said coupler member at the top and in communication at the bottom with the lower end of said inlet pipe, inlet and outlet pipes connecting with respective inlet and outlet passages of said coupler, and secondary inlet and outlet pipes connected respectively with said first mentioned inlet and outlet pipes and with said attenuated annular water chamber at the top of said heater body, and means for applying heat to the bottom of said heating tank.

In witness whereof, I hereunto subscribe my name.

WILLIAM F. LAUTENSCHLAGER.